United States Patent [19]

Kashihara et al.

[11] 4,443,087

[45] Apr. 17, 1984

[54] FOCUS STATE INDICATOR

[75] Inventors: Toshitsugu Kashihara; Tsunemi Yoshino, both of Nara; Akitoshi Morioka, Osaka; Hiroshi Iwata, Nara, all of Japan

[73] Assignee: West Electric Co., Ltd., Oyodo, Japan

[21] Appl. No.: 420,859

[22] Filed: Sep. 21, 1982

[30] Foreign Application Priority Data

Sep. 21, 1981 [JP] Japan ................... 56-150338

[51] Int. Cl.³ .............................. G03B 3/00
[52] U.S. Cl. .................... 354/401; 354/403
[58] Field of Search .............. 354/25, 195, 198

[56] References Cited

U.S. PATENT DOCUMENTS 4,358,190 11/1982 Sakai .................... 354/198
4,361,390 11/1982 Yamada ................ 354/198

Primary Examiner—Michael L. Gellner
Attorney, Agent, or Firm—Burgess, Ryan and Wayne

[57] ABSTRACT

A focus state indicator for a camera is provided such that the photographer may know a focus state in accordance with electrical signals respectively corresponding to the lens position in the previous focusing operation and a distance between a camera and a subject to be photographed. A circuit is arranged to generate a differential signal between the output electrical signals. The alarm operation of an alarm element is continuously changed between focused and out of focused states in accordance with the differential signal, so that the photographer can know the focus state.

3 Claims, 3 Drawing Figures

FOCUS STATE INDICATOR

BACKGROUND OF THE INVENTION

1. Field of the Invention

The present invention relates to a focus state indicator for a camera.

2. Description of the Prior Art

In a conventional indicator for letting the photographer to know a focus state by means of a sound generating unit such as a buzzer, a distance between a camera and a subject to be photographed is measured by a means of optical or ultrasonic transmission and reception. The measured distance is compared with a position of a photographic lens to determine the focus state. When the photographic lens is in the state in which the subject is focused on the focusing surface, a sound is generated to let the photographer to know the focus state. Furthermore, a means is also utilized in which sounds are generated at different periods or intervals respectively in the focused and out of focused states.

Although the conventional focus state indicator with a sound generating unit can distinguish the focused state from the out of focused state, it cannot designate the subsequently required focusing operations such as the rotational direction of the focusing ring or its proper angular displacement, resulting in inconvenience.

A light-emitting element is known as a means for letting the photographer to know the focus state. Even in such an element, the rotational direction of the focusing ring and its angular displacement cannot be signalled.

SUMMARY OF THE INVENTION

The present invention has been made in consideration of the above problems and its object is to provide a focus state indicator, wherein the current focused state and subsequent focusing operations required for focusing, such as the rotational direction of a focusing ring or its angular displacement can be determined by continuously changing a sound generating period or intervals, a sound loudness and the like of a sound generating unit such as an alarm element.

According to an aspect of the present invention, there is provided a focus state indicator wherein a focus state is advised to the photographer by a sound generating unit such as an alarm element, utilizing electrical signals respectively corresponding to a position of a photographic lens and a distance between a camera and a subject to be photographed. A differential circuit is arranged to produce a differential signal between the two electrical signals. The focusing operations in both focused and out of focused states are continuously controlled by the differential signal, so that the degree of out of focus is indicated so as to move the photographic lens to a position at where the subject is focused on the focal surface of the camera.

DETAILED DESCRIPTION OF THE PREFERRED EMBODIMENT

Figure 1:
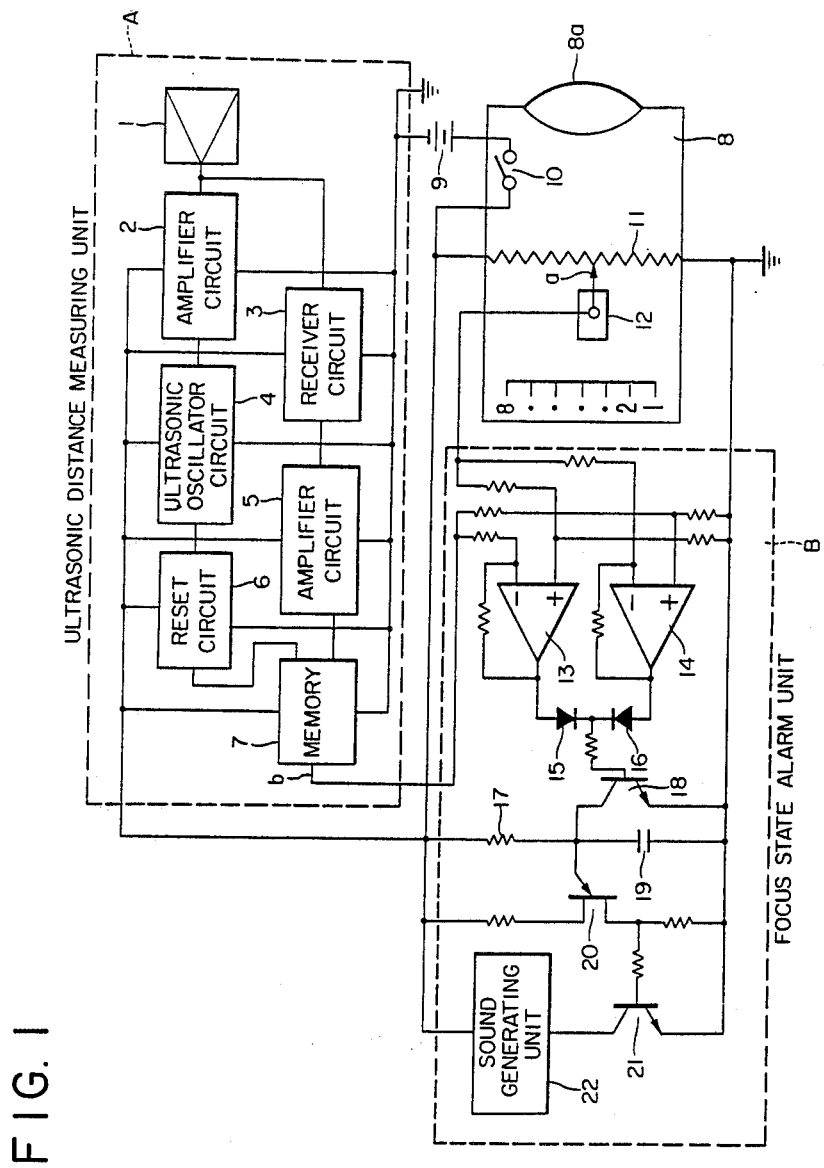
FIG. 1 shows a circuit diagram of a focus state indicator which uses a sound generating unit as an alarm element according to an embodiment of the present invention.

FIG. 1 shows a circuit diagram of an automatic focusing camera which has a focus state indicator according to an embodiment of the present invention. Referring to FIG. 1, an ultrasonic distance measuring unit A comprises an ultrasonic transducer 1, an amplifier circuit 2 for amplifying the ultrasonic wave, a receiver circuit 3, an ultrasonic oscillator circuit 4 for generating the ultrasonic wave periodically, an amplifier circuit 5 for amplifying the received wave, and a reset circuit 6 for resetting the previous distance data stored in the memory 7. A lens barrel 8 supports a lens 8a. Reference numeral 9 denotes a power source. A power source switch 10 which is arranged on the lens barrel 8 is turned on by hand. A resistor 11 is used as a member which is mounted on the lens barrel 8 to detect the lens position. A slidable brush 12 pivots with a focusing ring (not shown) so as to constitute a variable resistor together with the resistor 11.

Reference numerals 13 and 14 denote differential amplifier circuits, respectively; 15 and 16, rectifier diodes, respectively; 17, a resistor; 18, a transistor; 19, a capacitor which constitutes a time constant circuit together with the resistor 17; 20, a uni-junction transistor (to be referred to as a UJT hereinafter); and 21, a transistor for controlling the operation of a sound generating unit 22. Data from the memory 7 which represents a distance from the camera to the subject, and outputs from the variable resistor for detecting the position of the lens 8a are supplied to the differential amplifier circuits 13 and 14. The differential amplifier circuits 13 and 14 and the components indicated by reference numerals after 14 constitute a focus state alarm unit B.

The mode of operation of the circuit of the above arrangement will be described below.

When the operator presses the power source switch 10 of, for example, a push or touch-controlled switch which is disposed at a predetermined position on the lens barrel 8, power is supplied from the power source 9 to the ultrasonic distance measuring unit A.

The ultrasonic distance measuring unit A starts operating, and the ultrasonic wave generated by the ultrasonic oscillator circuit 4 is amplified by the amplifier circuit 2. The amplified signal is transmitted to the subject by means of the transducer 1. At the same time, the signal from the ultrasonic oscillator circuit 4 is supplied to the reset circuit 6. Before the receiver circuit 3 receives the signal reflected from the subject, data stored in the memory 7, that is, a distance signal obtained in the previous distance measuring operation, is reset.

The reflected signal from the subject is received by the receiver circuit 3 through the transducer 1, and is then amplified by the amplifier circuit 5 to be supplied to the memory 7 as a distance signal.

The distance signal stored in the memory 7 is supplied to the differential amplifier circuits 13 and 14 and is compared thereby with the lens position signal produced by the variable resistor which comprises the resistor 11 and the slidable brush 12. The compared result is amplified and generated by the differential amplifiers 13 and 14. The output signals from the differential amplifier circuits 13 and 14 are respectively supplied to the rectifier diodes 15 and 16 and are supplied to the base of the transistor 18 through a resistor. The relationship between outputs and inputs of the differential amplifier circuits 13 and 14 is shown below:

Output from the differential amplifier circuit 13: K(a−b),

Output from the differential amplifier circuit 14: K(b−a)

where K is a constant, a is the lens position signal, and b is the distance signal stored in the memory 7. If the level of the lens position signal is the same as that of the distance signal, outputs from the differential amplifier circuits 13 and 14 are both set to level "0". If the level of the lens position signal is lower than that of the distance signal, the output from the differential amplifier circuit 14 is higher than that of the differential amplifier circuit 13. When the level of the lens position signal is higher than that of the distance signal, the output from the differential amplifier circuit 14 is lower than that of the differential amplifier circuit 13.

When the photographic lens 8a is set in the focused position, the outputs from the differential amplifier circuits 13 and 14 are set to level "0". However, when the photographic lens 8a is set in an out of focused position, one of the outputs from the differential amplifier circuits 13 and 14 is higher than the other. The difference is increased as the degree of out of focus is increased.

The transistor 18 which is operated by the outputs from the differential amplifier circuits 13 and 14 which are operated as described above is kept OFF when the photographic lens 8a is in the focused position since the outputs from the differential amplifier circuits 13 and 14 are set to level "0". However, when the photographic lens 8a is set in an out of focused position, the output from one of the differential amplifier circuits 13 and 14 is supplied to the base of the transistor 18. A collector current of the transistor 18 flows in accordance with the base current.

When the transistor 18 is operated as described above, the charge of the capacitor 19 is controlled via the resistor 17. As a result, the operation of the UJT 20 which is controlled by the charge of the capacitor 19 is controlled by the ON/OFF state of the transistor 18.

When the focused state is obtained, the UJT 20 oscillates at a period determined by a time constant set by the resistor 17 and the capacitor 19, since the transistor 18 is OFF. However, in an out of focused state, a current flowing from the resistor 17 to the capacitor 19 is bypassed since the transistor 18 is turned conductive in accordance with the output levels from the differential amplifier circuits 13 and 14. Thus, the charge time of the capacitor 19 required for the operating level of UJT 20 becomes long, and the ON/OFF period of the UJT 20 is longer than that when the focused state is obtained.

The width of the pulse from the UJT 20 is kept constant regardless of its frequency. In order to stabily supply energy to the base of the transistor 21 so as to control the sound generating unit 22, the transistor 21 is rendered conductive during a time interval corresponding to the output pulse width of the UJT 20.

When the transistor 21 is ON, the power source 9 is connected to the sound generating unit 22 which in turn generates a sound. However, when the transistor 21 is OFF, the sound generating unit 22 does not generate a sound.

Figure 2A:
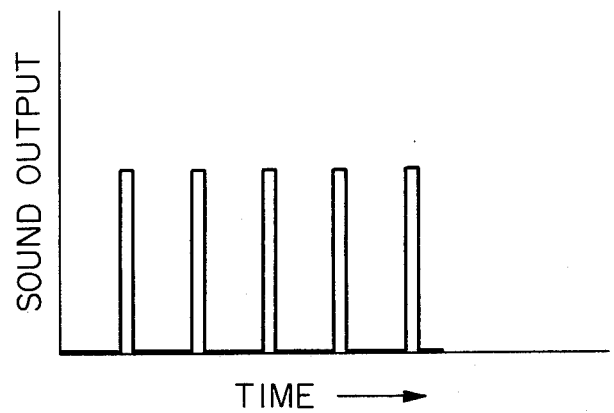
FIGS. 2A and 2B show graphs for explaining the sound generating frequency as a function of time with respect to the lens position.
Figure 2B:
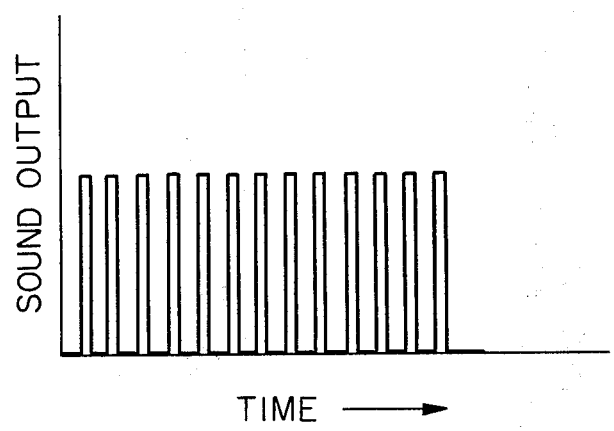

As described above, since the ON/OFF period of the UJT 20 is changed in accordance with the conductivity of the transistor 18, that is, in accordance with the degree of out of focus, the sound generating period of the sound generating unit 22 is continuously changed. For example, if the output pulse frequency of the UJT 20 is controlled by the differential amplifier circuits 13 and 14 and the transistor 18 to cause the sound generating unit 22 to generate sounds with a period shown in FIG. 2A in the out of focused state, and to generate sounds with a period as shown in FIG. 2B in the focused state, the sound generating period is increased as the degree of out of focus is worse. However, when the focused state is obtained, a sound is generated at the smallest period. Therefore, the rotational direction of the focusing ring and its angular displacement can be determined in accordance with the period of sounds.

As described above, the focus state indicator according to the embodiment shown in FIG. 1 has an arrangement in which the sound generating period is changed in accordance with the degree of out of focus. Furthermore, since an electrical output corresponding to the degree of out of focus is obtained by the differential amplifier circuits 13 and 14, the transistor 18 and so on, the sound loudness can alternatively be continuously changed in accordance with the degree of out of focus.

When the ON/OFF period of the UJT 20 is properly determined, the sound generating unit 22 may generate a continuous sound in the focused state. Therefore, it is possible to continuously change the sound generating period in accordance with the degree of out of focus.

Furthermore, the electrical signals from the differential amplifier circuits 13 and 14 in accordance with the focused state may be supplied to a circuit (not shown) which is a combination of a plurality of comparators and a plurality of light-emitting elements, thus obtaining the same effects as described above. Unlike the alarm by the sound generating unit, a desired number of light-emitting elements are arranged in a row, and the light-emitting element at the center of the row is used to indicate the focused state. Each light-emitting element is controlled with reference to the control element by the outputs described above in accordance with the degree of out of focus.

The sound generating unit or the light-emitting elements, or a combination thereof may be utilized to obtain the desired effect in accordance with the focus state.

In summary, according to the present invention, the operation of the alarm element can be continuously changed, resulting in an easy focus adjusting operation with excellent operability.

What is claimed is:

1. A focus state indicator comprising: distance measuring means for converting distance data from a camera to a subject to be photographed to a first electrical signal; lens position detecting means for producing a second electrical signal corresponding to a position of a photographic lens; first and second differential amplifier circuits which respectively receive the first and second electrical signals in an inverted relation; switching means comprising a transistor which simultaneously receives outputs from said first and second differential amplifier circuits through first and second rectifying means respectively and a switch circuit which is controlled by said transistor; and an alarm element such as a sound generating unit which is controlled by said switching means, an alarm mode of said alarm element being successively changed in accordance with the degree of focus detected by first and second electrical signals.

2. A focus state indicator according to claim 1, wherein said switch circuit comprising a charge circuit which has a resistor and a capacitor to control a charge operation of said capacitor in accordance with an operating state of said transistor; a first switch element which is controlled by a charge voltage of said capacitor; and a second switch which is controlled by said first switch element so as to control the alarm operation of said alarm element.

3. A focus state indicator comprising: distance measuring means for converting distance data from a camera to a subject to be photographed to a first electrical signal; lens position detecting means for producing a second electrical signal corresponding to a position of a photographic lens; first and second differential amplifier circuits which respectively receive the first and second electrical signals in an inverted relation; comparator switching means which simultaneously receives outputs from said first and second differential amplifier circuits through first and second rectifying means respectively to produce a plurality of output signals in accordance with a level of said output signals from said first and second differential amplifier circuits; and an alarm element such as a sound generating unit which is controlled by said comparator switching means, an alarm operation of said alarm element being successively changed in accordance with the degree of focus detected by first and second electrical signals.

* * * * *